E. W. SMITH.
SECONDARY OR STORAGE BATTERY.
APPLICATION FILED JULY 21, 1910.
1,054,801.
Patented Mar. 4, 1913.
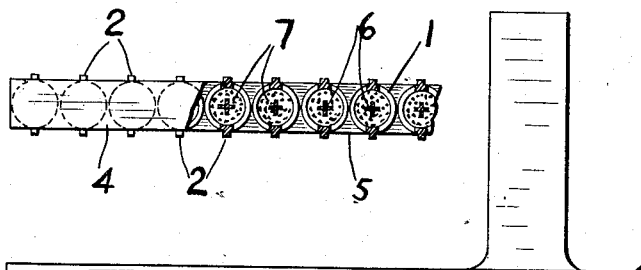
FIG. 2.
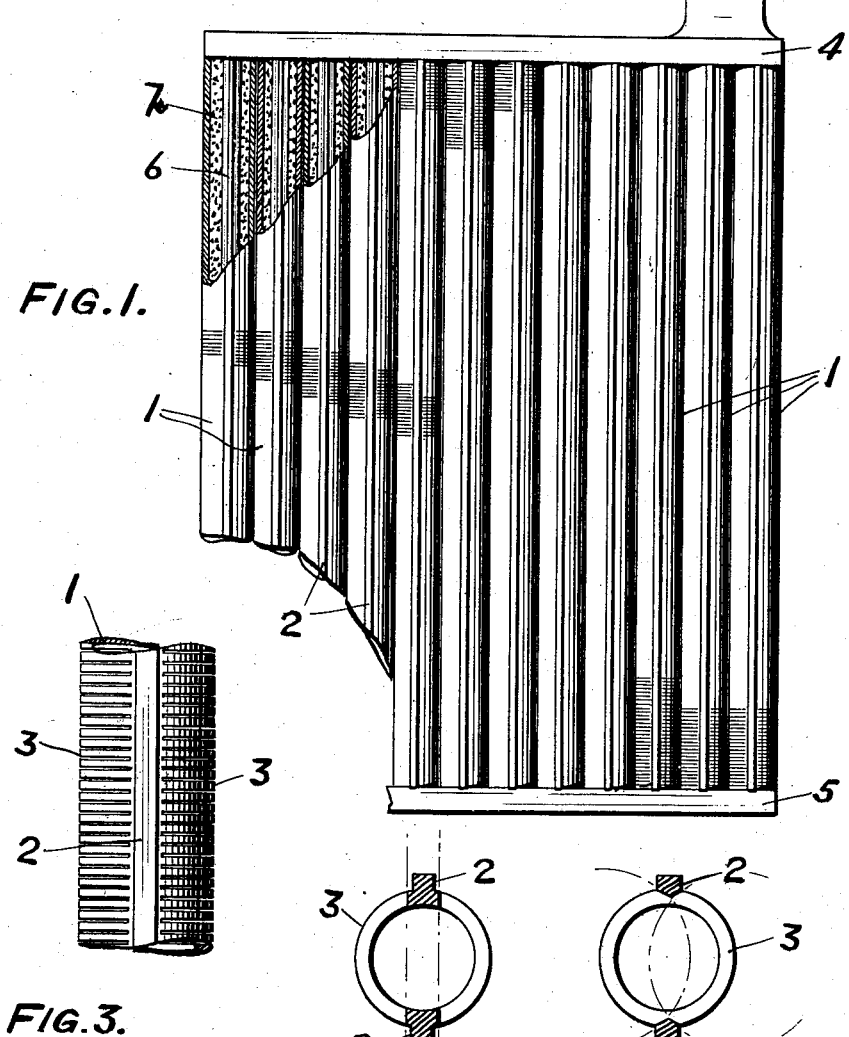
FIG. 1.
FIG. 3.
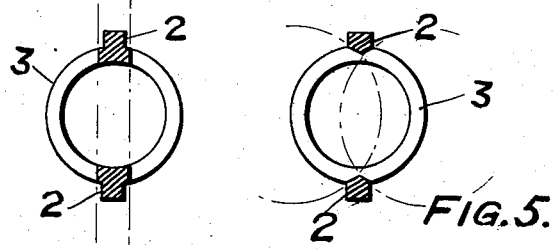
FIG. 4.     FIG. 5.
WITNESSES:
Robt R. Kitchel
R. M. Gilligan
INVENTOR
Edward Wanton Smith
BY
Augustus B. Stoughton.
ATTORNEY

UNITED STATES PATENT OFFICE.

EDWARD WANTON SMITH, OF PHILADELPHIA, PENNSYLVANIA.

SECONDARY OR STORAGE BATTERY.

1,054,801.

Specification of Letters Patent.

Patented Mar. 4, 1913.

Application filed July 21, 1910. Serial No. 572,996.

*To all whom it may concern:*

Be it known that I, EDWARD WANTON SMITH, a citizen of the United States, residing at Philadelphia, in the county of Philadelphia and State of Pennsylvania, have invented certain new and useful Improvements in Secondary or Storage Batteries, of which the following is a specification.

The present invention relates to an improvement in that type of plate or electrode which comprises a frame having rods upon which are arranged tubular perforated envelops or covers containing active material or material to become active.

The principal object of the present invention is to provide comparatively inexpensive and efficient means for insulating such plates from their neighbors when assembled in a storage battery.

Other objects of the invention will appear from the following description which will be made in connection with the embodiment, but not the only embodiment, of it chosen for illustration in the accompanying drawings in which—

Figure 1, is a side view with parts broken away illustrating a plate or electrode embodying the invention. Fig. 2, is a top view with parts broken away of a portion of the plate shown in Fig. 1. Fig. 3, is a side view of an envelop or cover embodying features of the invention, and Figs. 4 and 5, are respectively sectional views of the envelop or cover embodying a modification of the invention.

In the drawings, 1 is a tubular envelop or cover provided with insulating imperforate ribs 2, that project from the surface thereof and with perforated portions 3. The ribs 2, are of insulating material and the tube or envelop may be made of hard rubber but the invention is not limited to that material. The perforations of the portions 3, may be of any desired kind and by showing them in the form of slots I do not intend to exclude the use of other forms. Slots have certain advantages and where they are used the ribs 2, may extend from the interior surface of the tube, as in Fig. 4, or from a point somewhat outside of the interior surface of the tube.

4 and 5, are grid sections connected by rods 6, upon which the tubes or envelops are mounted. The space between the inner surface of the tubes or envelops and the rods is filled with active material or material to become active 7. The grid sections lie inside of the faces of the ribs so that the insulating ribs 2, project beyond the faces of the plate and serve to insulate it from its neighbor when mounted in a battery.

I do not claim herein the described tubular end element since the latter forms the subject matter of my application, Serial No. 637,249, filed July 7th, 1911.

What I claim is:

A secondary or storage battery plate comprising a grid section provided with a plurality of parallel rods, active material or material to become active surrounding the rods, and permeable tubular envelops or covers of cylindrical bore, one surrounding each rod, and inclosing the active material and provided with solid insulated ribs which extend beyond the grid section, substantially as described.

In testimony whereof I have hereunto signed my name.

EDWARD WANTON SMITH.

Witnesses:
 BRUCE FORD,
 EDGAR LONGAKER.